US012724639B2

(12) United States Patent
Pu et al.

(10) Patent No.: US 12,724,639 B2
(45) Date of Patent: Sep. 1, 2026

(54) SIDECAR DEPLOYMENT METHOD AND APPARATUS IN SERVICE MESH, ELECTRONIC DEVICE AND STORAGE MEDIUM

(71) Applicant: ZTE CORPORATION, Shenzhen (CN)

(72) Inventors: Jiange Pu, Shenzhen (CN); Jin Zhang, Shenzhen (CN); Qiang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 343 days.

(21) Appl. No.: 18/704,713

(22) PCT Filed: Oct. 9, 2022

(86) PCT No.: PCT/CN2022/124174

§ 371 (c)(1),
(2) Date: Apr. 25, 2024

(87) PCT Pub. No.: WO2023/071744

PCT Pub. Date: May 4, 2023

(65) Prior Publication Data

US 2026/0154111 A1 Jun. 4, 2026

(30) Foreign Application Priority Data

Oct. 29, 2021 (CN) ......................... 202111267095.X

(51) Int. Cl.
*G06F 9/50* (2006.01)

(52) U.S. Cl.
CPC .................................. *G06F 9/5027* (2013.01)

(58) Field of Classification Search
CPC ............................... G06F 9/5027; G06F 9/455
See application file for complete search history.

(56) References Cited

U.S. PATENT DOCUMENTS 10,623,390 B1 4/2020 Rosenhouse
10,764,244 B1 9/2020 Mestery et al.
(Continued)

FOREIGN PATENT DOCUMENTS

CN 103873489 A 6/2014
CN 106961475 A 7/2017
(Continued)

OTHER PUBLICATIONS

European Patent Office. Extended European Search Report for EP Application No. 22885625.8, mailed Feb. 6, 2025, pp. 1-8.
InfoQ. "Large scale implementation of Service Mesh in Baidu's core business," Sep. 11, 2021, https://www.sohu.com/a/489199205_355140.
International Searching Authority. International Search Report and Written Opinion for PCT Application No. PCT/CN2022/124174 and English translation, mailed Nov. 30, 2022, pp. 1-12.
(Continued)

*Primary Examiner* — Dong U Kim
(74) *Attorney, Agent, or Firm* — Vivacqua Crane, PLLC

(57) ABSTRACT

The present disclosure provides a method for sidecar deployment in a service mesh, an electronic device and a storage medium. The method for sidecar deployment in a service mesh may include: determining, according to a resource requirement and a reliability requirement of a microservice, a sidecar type configured for the microservice, wherein the sidecar type comprises an exclusive sidecar and a shared sidecar; and deploying a sidecar for the microservice according to the sidecar type, and allocating a published port to the microservice. In response to the sidecar type configured for the microservice being the shared sidecar, the published port allocated to the microservice is different from a published port of another microservice sharing the sidecar.

20 Claims, 8 Drawing Sheets

(56) References Cited

U.S. PATENT DOCUMENTS

| | | | | |
|---|---|---|---|---|
| 2019/0166023 | A1* | 5/2019 | Hutchison | H04L 41/069 |
| 2020/0177549 | A1* | 6/2020 | Barton | H04L 63/1441 |
| 2020/0329114 | A1 | 10/2020 | Bahl et al. | |
| 2020/0358802 | A1* | 11/2020 | Viswambharan | G06F 9/5072 |
| 2021/0273918 | A1 | 9/2021 | Veereshwara et al. | |
| 2022/0070279 | A1* | 3/2022 | Pang | G06F 21/577 |

FOREIGN PATENT DOCUMENTS

| | | | |
|---|---|---|---|
| CN | 109981789 | A | 7/2019 |
| CN | 111130892 | A | 5/2020 |
| CN | 111176723 | A | 5/2020 |
| CN | 111263933 | A | 6/2020 |
| CN | 111638945 | A | 9/2020 |
| CN | 112000365 | A | 11/2020 |
| CN | 112351106 | A | 2/2021 |
| CN | 112860342 | A | 5/2021 |
| CN | 112929230 | A | 6/2021 |
| CN | 113243004 | A | 8/2021 |
| CN | 113296927 | A | 8/2021 |
| CN | 113709707 | A | 11/2021 |
| WO | 2019169405 | A1 | 9/2019 |
| WO | 2020227266 | A1 | 11/2020 |

OTHER PUBLICATIONS

Schiesser, M. "Comparing Service Meshes: Linkerd vs Istio," Mar. 19, 2019, https://www.sohu.com/a/302348441_671228.

Shen, L. "Research and Implementation of Internet of Things Platform Based on Service Mesh," Master's Thesis, Zhejiang Sci-Tech University, Dec. 14, 2018, pp. 1-66.

Tao, Z., et al. "Research and Implement of Micro-Services Architecture Service Mesh," Computer Applications, vol. 39, Issue 1, 2020, pp. 1-6.

The State Intellectual Property Office of People's Republic of China. First Office Action for CN Application No. 202111267095.X and English translation, mailed Dec. 2, 2021, pp. 1-8.

The State Intellectual Property Office of People's Republic of China. First Search Report for CN Application No. 202111267095.X and English translation, mailed Nov. 24, 2021, pp. 1-8.

The State Intellectual Property Office of People's Republic of China. Supplemental Search Report for CN Application No. 202111267095.X and English translation, mailed Dec. 15, 2021, pp. 1-6.

Zheng, J., et al. "Research on Service Governance of Microservice Architecture Based on Service Mesh," Computer Systems & Applications, vol. 28, No. 2, 2019, pp. 55-61.

* cited by examiner

Microservice A → Access request → Sidecar A → Sidecar B → Microservice B

SIDECAR DEPLOYMENT METHOD AND APPARATUS IN SERVICE MESH, ELECTRONIC DEVICE AND STORAGE MEDIUM

CROSS-REFERENCE TO RELATED APPLICATION

This application is a national stage filing under 35 U.S.C. § 371 of international application number PCT/CN2022/124174, filed Oct. 9, 2022, which claims priority to Chinese patent application No. 202111267095.X filed Oct. 29, 2021. The entire contents of these applications are incorporated herein by reference in their entirety.

TECHNICAL FIELD

The present disclosure relates to the technical field of microservices, and in particular, to a method and apparatus for deploying a sidecar in a service mesh, an electronic device, and a storage medium.

BACKGROUND

Microservice is a novel software development technology developed in recent years. This technology divides traditional services into many fine-grained, loosely coupled microservices that can be independently deployed. As conventional monolithic software architectures can no longer meet the technical requirements of current Internet products, the microservice technology has developed vigorously.

With the development of the microservice technology, service mesh came into being. The service mesh is an infrastructure layer for handling communication between microservices, and is responsible for transmitting reliable network requests for cloud native applications with complex architecture. After a service mesh is introduced into a microservice system, network communication between microservices is implemented using proxies in the service mesh, i.e., the communication between microservices is realized through the service mesh. A sidecar is created for each microservice and an association relationship is established between the created sidecar and the microservice.

However, due to the huge number of microservices in most microservice systems, the number of sidecars is also very large. The service mesh formed by the large number of sidecars occupies too many network resources.

SUMMARY

The present disclosure provides a method and apparatus for deploying a sidecar in a service mesh, an electronic device, and a storage medium.

In view of the above, an embodiment of the present disclosure provides a method for deploying a sidecar in a service mesh, which may include: determining, according to a resource requirement and a reliability requirement of a microservice, a sidecar type configured for the microservice, where the sidecar type includes an exclusive sidecar and a shared sidecar; and deploying a sidecar for the microservice according to the sidecar type, and allocating a published port to the microservice, where in response to the sidecar type configured for the microservice being the shared sidecar, the published port allocated to the microservice is different from a published port of another microservice sharing the sidecar.

An embodiment of the present disclosure provides an apparatus for deploying a sidecar in a service mesh, which may include: a determining module, configured for determining, according to a resource requirement and a reliability requirement of a microservice, a sidecar type configured for the microservice, where the sidecar type includes an exclusive sidecar and a shared sidecar; and a deployment module, configured for deploying a sidecar for the microservice according to the sidecar type, and allocating a published port to the microservice, where in response to the sidecar type configured for the microservice being the shared sidecar, the published port allocated to the microservice is different from a published port of another microservice sharing the sidecar.

An embodiment of the present disclosure provides an electronic device, which may include: at least one processor; and a memory communicatively connected to the at least one processor, where the memory stores an instruction executable by the at least one processor which, when executed by the at least one processor, causes the at least one processor to implement the method for deploying a sidecar in a service mesh.

An embodiment of the present disclosure provides a computer-readable storage medium, storing a computer program which, when executed by a processor, causes the processor to implement the method for deploying a sidecar in a service mesh.

BRIEF DESCRIPTION OF DRAWINGS

One or more embodiments are illustrated by the diagrams in the corresponding drawings and these illustrative descriptions are not intended to constitute a limitation to the embodiments. Same or like elements are denoted by the same reference numerals in the drawings. The drawings are not drawn to scale unless otherwise particularly stated.

DETAILED DESCRIPTION

To make the objectives, technical schemes, and advantages of the embodiments of the present disclosure clear, a detailed description of the embodiments of the present disclosure will be made in conjunction with the drawings. However, it may be understood by those having ordinary skills in the art that although various embodiments of the present disclosure provide many technical details to make readers better understand the present disclosure, the technical schemes claimed in the present disclosure can be realized even without these technical details and various variations and modifications made based on the following embodiments. The following embodiments are divided for convenience of description and are not intended to constitute any limitation on the specific implementations of the present disclosure. The embodiments may be combined or used as references for each other if not in collision.

The service mesh is an infrastructure layer for handling communication between microservices. Cloud native applications have complex service topologies, in which the service mesh is responsible for implementing reliable transmission of requests. After a service mesh is introduced into a microservice system, network communication between microservices is implemented using proxies in the service mesh, and the microservices do not need to be aware of the existence of the service mesh. Therefore, the service mesh may be considered as Transmission Control Protocol/Internet Protocol (TCP/IP) between microservices.

Figures 1, 2:
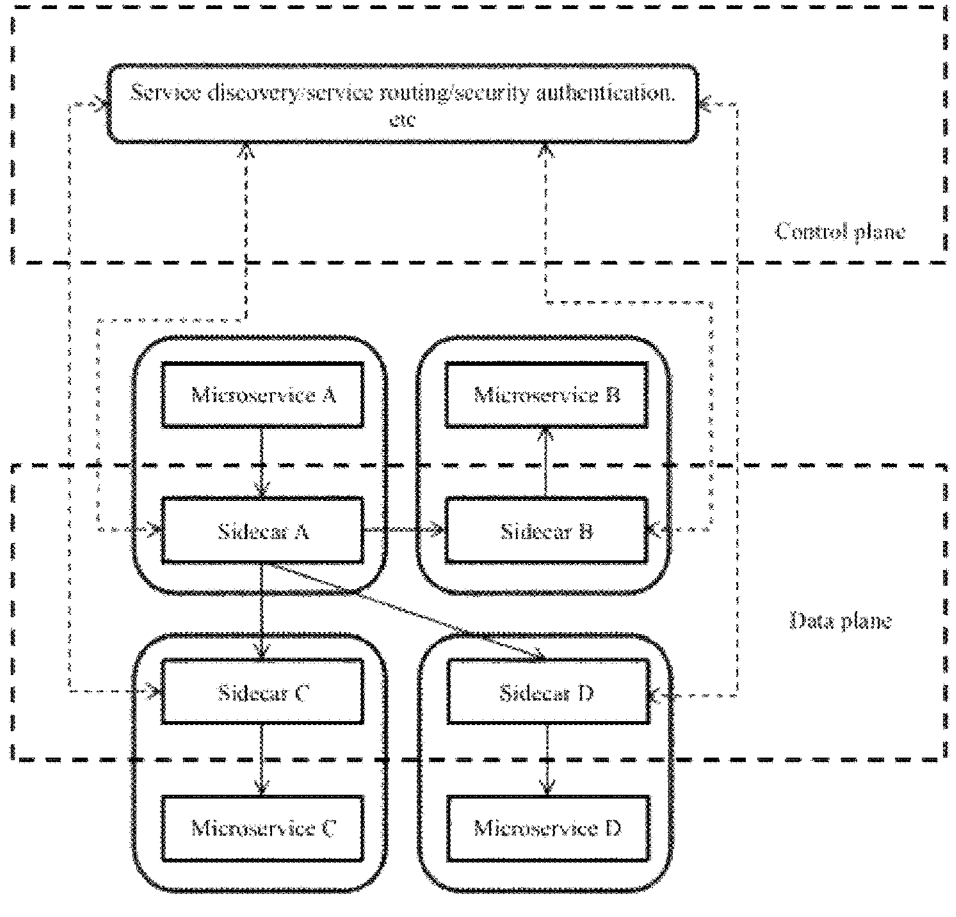
FIG. 1 is a schematic structural diagram of a service mesh according to an embodiment of the present disclosure.
FIG. 2 is a schematic diagram of a transmission path of microservice communication after introduction of a service mesh according to an embodiment of the present disclosure.

The service mesh includes two parts: user plane and control plane. FIG. 1 shows a schematic structural diagram of the service mesh. Components in the user plane are generally implemented in the form of an array of lightweight network proxies. These proxies are deployed together with microservices and are responsible for all network communication between the microservices. The proxies are also called sidecars because they are deployed alongside the microservices. The control plane is responsible for managing the sidecars in the user plane, which may include delivering service address information to the sidecars, configuring service routes, distributing security certificates, and so on.

To enable the service mesh to implement all the network communication in the microservice system using the proxies, the sidecars have to intercept network requests of microservices associated therewith. There are several interception methods as follows.

I. Traffic Hijacking

An iptables rule is configured for a host where a microservice is located, such that traffic from and to the microservice are both forwarded to a sidecar associated with the microservice, and then forwarded out by the sidecar. When traffic passes through the sidecar, the sidecar can control the communication process. Before and after traffic hijacking is enabled, an accessed address of the microservice remains unchanged. FIG. 2 is a schematic diagram of a transmission path of microservice communication after introduction of a service mesh. Using a microservice A and a microservice B as an example, after a service mesh is introduced, a sidecar A is configured for the microservice A, and a sidecar B is configured for the microservice B. A call request sent by the microservice A to the microservice B is intercepted by the sidecar A and forwarded to the sidecar B, and then sent by the sidecar B to the microservice B.

II. Traffic Takeover

Figures 3, 4:
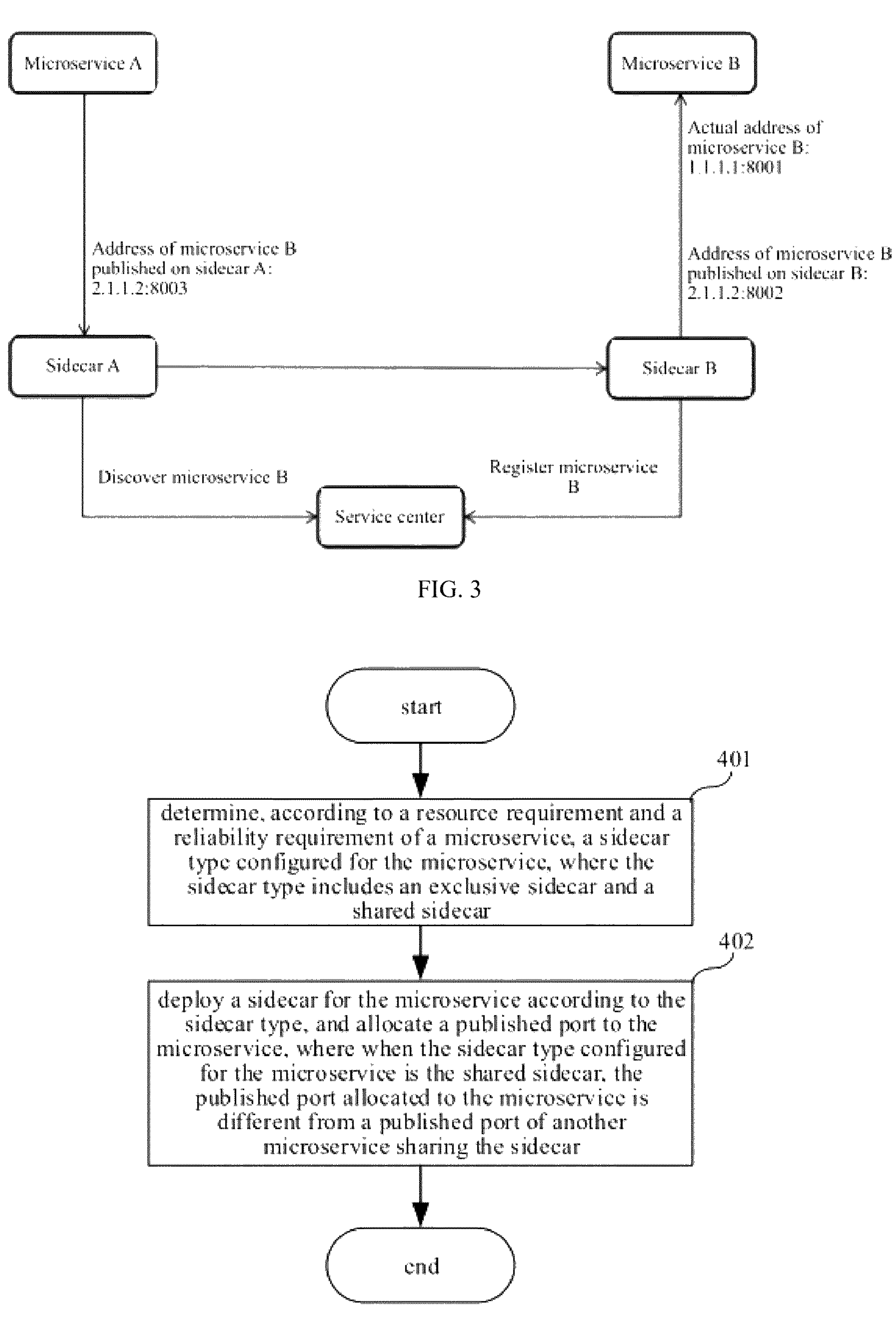
FIG. 3 is a schematic diagram of a process of microservice communication after introduction of a service mesh according to an embodiment of the present disclosure.
FIG. 4 is a flowchart of a method for deploying a sidecar in a service mesh according to an embodiment of the present disclosure.

After the introduction of the service mesh, microservice registration is taken over by the sidecar, and the accessed address of the microservice is replaced with an address of the sidecar. FIG. 3 shows a schematic diagram of a process of microservice communication after introduction of a service mesh. Using a microservice A and a microservice B with a service address 1.1.1.1:8001 as an example, after a service mesh is introduced, a sidecar A is configured for the microservice A, and a sidecar B is configured for the microservice B. The microservice B, as a callee, sends its own service address to the sidecar B. The sidecar B allocates a port to the microservice B, and then registers an address of the sidecar B (2.1.1.1:8002) as the address of this microservice B to a service center. After the registration, the service center adds a service record: microservice B address 2.1.1.1:8002. As the caller of the microservice B, the microservice A needs to configure an access address of the microservice B on the sidecar A before using the microservice B. In this case, the access address is 2.1.1.2:8003. When the microservice A accesses the microservice B, the microservice A sends a request to an address of the sidecar A. The sidecar A may learn an address of the microservice B from the service center, and therefore send the request to the address of the sidecar B. Finally, the sidecar B sends the request to the actual address of the microservice B. After traffic takeover is enabled, the accessed address of the microservice actually becomes the address of the sidecar, but the microservice is still not aware of the existence of the service mesh, because the above configurations related to the sidecars can be automatically completed by the components of the service mesh and the microservice deems that the address of the sidecar is the actual address of the microservice.

Traffic hijacking is a common method for intercepting a network request of a microservice in the service mesh, because this method does not change the address of the microservice and has little impact on the entire application. However, these method for network request interception have the same characteristic: sidecars and microservices are in a one-to-one correspondence. Such a design leads to high recourse occupation of the sidecars.

In the microservice system, a service is divided into many fine-grained microservices, so there are a large number of microservices in the system. As each microservice corresponds to one sidecar, there is also a large number of sidecars. Once started, a sidecar occupies basic resources. When a new microservice is registered, the sidecar needs to forward a request, further leading to increased dynamic resource consumption. Even if the resource consumption of each sidecar is not high, the total consumption of resources by all the sidecars is very high. As a result, the resources occupied will increase by a large proportion after the introduction of the service mesh.

The resources occupied by sidecars, whether in absolute value or relative proportion, are very considerable. In some special scenarios with very limited resources, such as an edge cloud, it is particularly necessary to minimize the occupation of resources by sidecars.

However, conventional methods for saving resources in the service mesh focus on the optimization of each single sidecar. Although these methods can save resources to some extent, a lot of resources are consumed as long as the number of sidecars is large. Reasons are as follows. (1) Once started, a sidecar process consumes basic resources even if there is no microservice registration. (2) As long as a microservice is registered, the sidecar has to synchronize data. Even if the sidecar does not need to forward a request, it has to consume resources, e.g., for starting listening on each microservice, preparing processing threads, saving performance data, etc. (3) When a microservice sends a request, the sidecar needs to consume more resources.

An embodiment of the present disclosure relates to a method for deploying a sidecar in a service mesh. FIG. 4 shows an example process of the method.

In this embodiment, according to a resource requirement and a reliability requirement of a microservice, a sidecar type configured for the microservice is determined. The sidecar type includes an exclusive sidecar and a shared sidecar. A sidecar is deployed for the microservice according to the sidecar type, and a published port is allocated to the microservice. When the sidecar type configured for the microservice is the shared sidecar, the published port allocated to the microservice is different from a published port of another microservice sharing the sidecar.

Implementation details of the method for deploying a sidecar in a service mesh in this embodiment will be described below by way of example and the following contents are provided only for convenience of understanding the implementation details of the present scheme and are not necessary for implementing the present scheme. As shown in FIG. 4, the example process may include the following steps.

In a step of 401, according to a resource requirement and a reliability requirement of a microservice, a sidecar type configured for the microservice is determined. The sidecar type includes an exclusive sidecar and a shared sidecar.

In this step, an apparatus for deploying a sidecar in a service mesh is configured to determine, according to the resource requirement and the reliability requirement of the microservice, the sidecar type configured for the microservice. For example, an exclusive sidecar may be configured for a microservice which has to send and receive a large number of requests or having high requirements on network performance, and a shared sidecar may be configured for a microservice which does not have high requirements on network performance. As such, an exclusive sidecar or a shared sidecar may be configured for a microservice as required. In this way, not only the configured sidecar can meet the requirements of the microservice, but also the number of sidecars in the service mesh can be reduced through the configuration of shared sidecars, thereby saving resources.

In an example, after determining a sidecar type configured for the microservice and prior to deploying a sidecar for the microservice according to the sidecar type, the method may further include: configuring a parameter of the sidecar for the microservice. The parameter includes one or any combination of: an identifier (ID) of the sidecar, a name of the sidecar, a resource quota of the sidecar, and a quantity of sidecars. In this example, in addition to the sidecar type for the microservice, other sidecar-related parameters may further be configured for the microservice.

For a microservice for which the configured sidecar type is a shared sidecar, the ID of the sidecar can enable the microservice to be associated with an existing sidecar. For example, a plurality of microservices of a functional module may be associated with a shared sidecar, or a microservice not having high requirements on resources and reliability may be associated with a preset global shared sidecar.

It should be noted that the association relationship between microservices and sidecars is not limited to a one-to-one relationship, but may also be a one-to-many, many-to-one, or many-to-many relationship. For example, in order to avoid single point of failure of sidecars, a single microservice may be associated with multiple sidecars. This may be realized by configuring the number of sidecars for the microservice.

Figure 5:
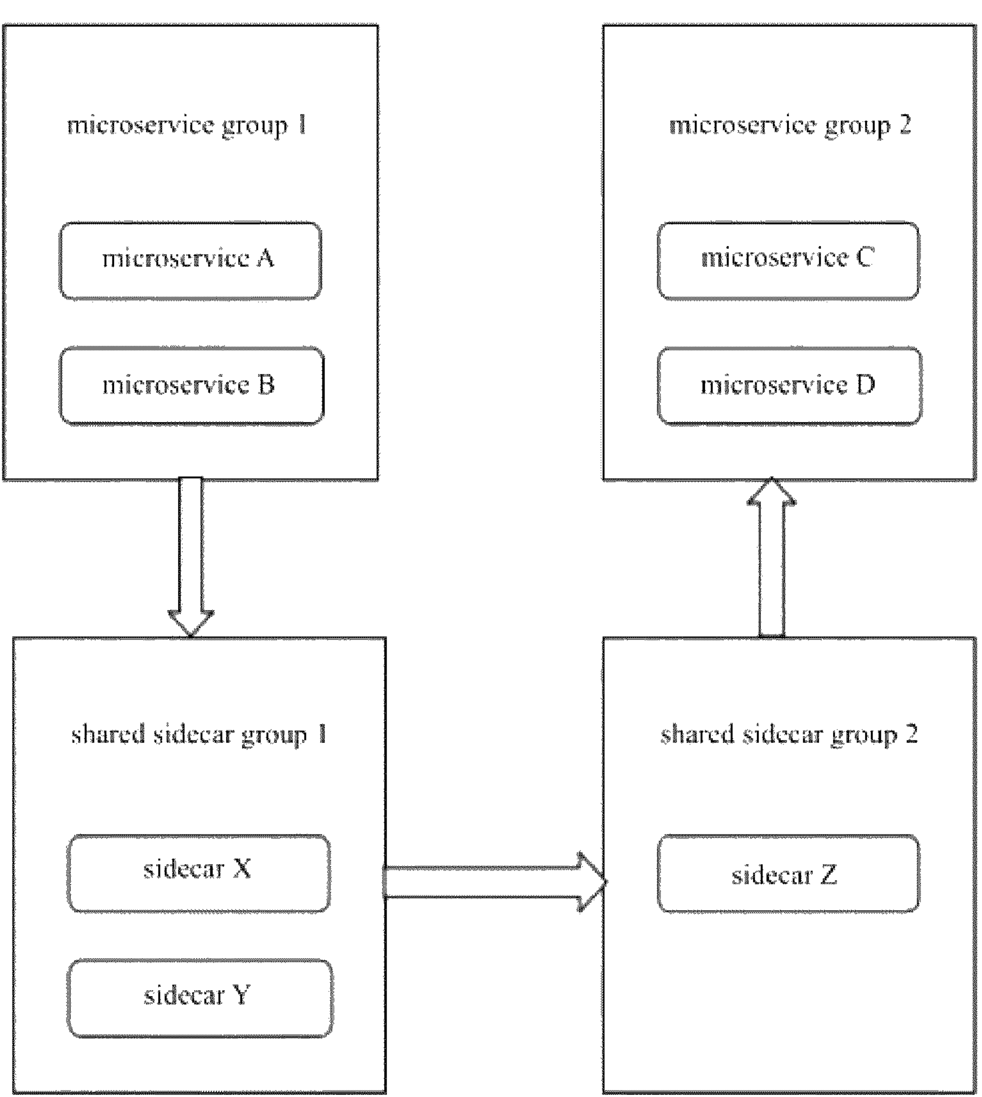
FIG. 5 is a schematic diagram of a transmission path of microservice communication according to another embodiment of the present disclosure.

FIG. 5 is a schematic diagram of a transmission path of microservice communication in which the relationship between microservices and sidecars is many-to-many, i.e., one group of microservices corresponds to one group of sidecars. When a microservice in the microservice group 1 needs to access a microservice in a microservice group 2, the microservice in the microservice group 1 sends a request, which is forwarded by any sidecar in a sidecar group 1 corresponding to the microservice group 1 to any sidecar in a sidecar group 2 corresponding to the microservice group 2, and finally forwarded by the sidecar in the sidecar group 2 to the microservice in the microservice group 2.

In practice, because sidecars can be shared, the sidecars are no longer deployed alongside the microservices, but are deployed outside the microservices. In related technologies where sidecars are deployed alongside microservices, upgrading of a sidecar may require restarting the entire microservice to update the sidecar version, leading to a long service interruption. When sidecars are deployed outside microservices, the flexibility of sidecar deployment is greatly improved, so that a sidecar can be updated independently without restarting the corresponding microservice. A new version of the sidecar is deployed to gradually take over traffic. After the traffic takeover is complete, the old version of the sidecar is deleted. Therefore, during the upgrade, the microservice does not need to be restarted.

In a step of 402, a sidecar is deployed for the microservice according to the sidecar type, and a published port is allocated to the microservice. When the sidecar type configured for the microservice is the shared sidecar, the published port allocated to the microservice is different from a published port of another microservice sharing the sidecar.

In an example, the apparatus for deploying a sidecar in a service mesh deploys a sidecar for the microservice by using different methods depending on the sidecar type. For microservices for which the configured sidecar type is the shared sidecar, because multiple microservices may share one sidecar, and ports of different microservices may have an identical number, the sidecar can no longer use an original port of the microservice. Therefore, a published port different from ports of other microservices sharing the sidecar is allocated to the microservice, such that the sidecar can distinguish requests of different microservices according to destination ports, to avoid confusion during request forwarding and ensure normal communication between the microservices.

After the sidecar is deployed for the microservice and the published port is allocated to the microservice, the sidecar has to listen on the published port of the microservice in order to process the request from the microservice in time.

Figure 6:
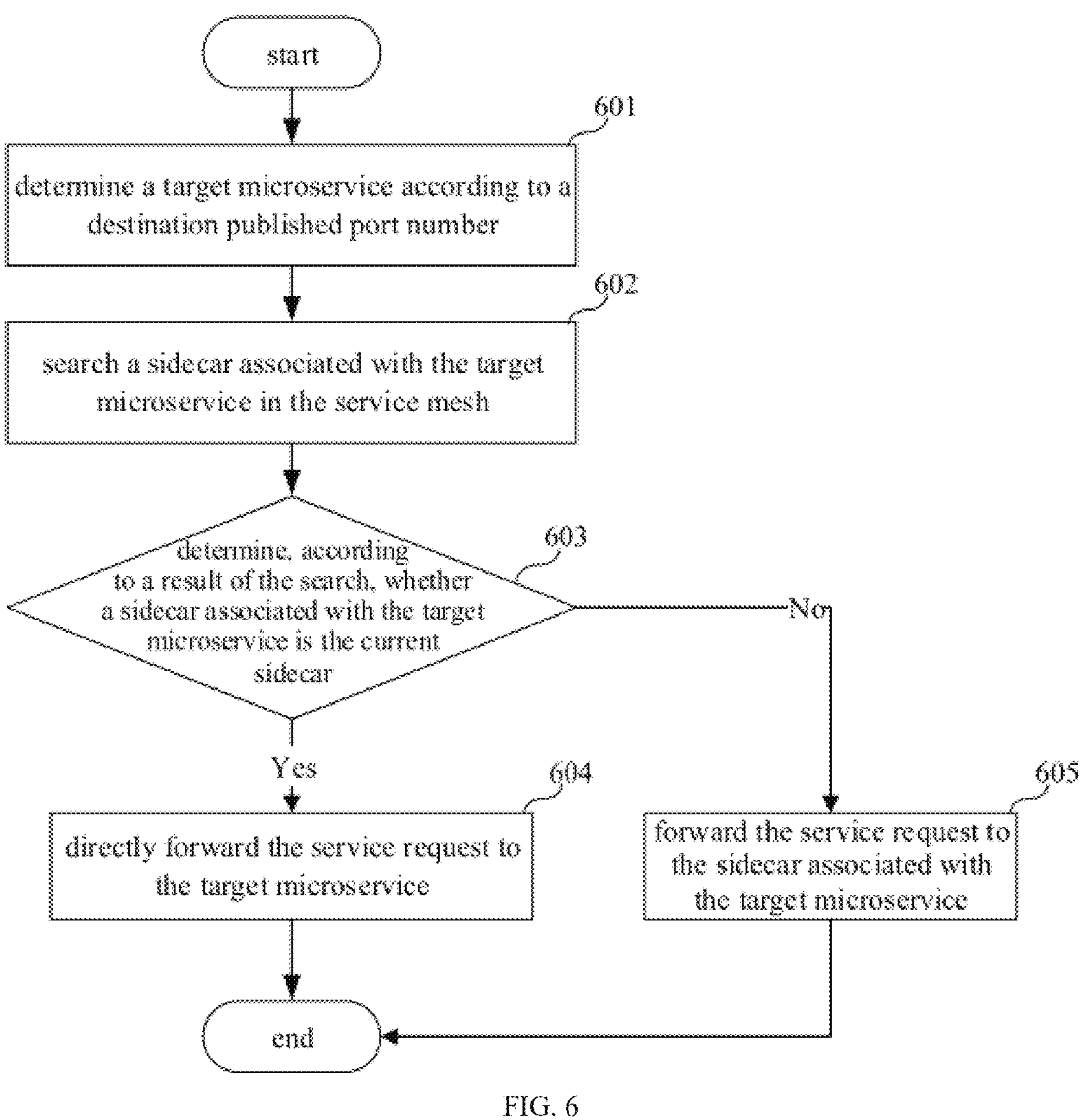
FIG. 6 is a flowchart of a sidecar forwarding a microservice request according to another embodiment of the present disclosure.

In an example, the sidecar type of a sidecar is the shared sidecar, and a flowchart of the sidecar forwarding a request from a microservice is shown in FIG. 6.

In a step of 601, a target microservice is determined according to a destination published port number. After detecting a service request from an associated microservice, the current sidecar can accurately determine the target microservice according to the destination published port number at first.

In a step of 602, a sidecar associated with the target microservice is searched in the service mesh.

In a step of 603, it is determined according to a result of the search whether a sidecar associated with the target microservice is the current sidecar. If so, i.e., the result of the search indicates that the sidecar associated with the target microservice is the current sidecar, step 604 is executed. Otherwise, step 605 is executed.

In the step of 604, the service request is directly forwarded to the target microservice. If the sidecar associated with the target microservice is the current sidecar, the service request is forwarded to the target service.

In the step of 605, the service request is forwarded to the sidecar associated with the target microservice. If the sidecar associated with the target microservice is not the current sidecar but is another sidecar in the service mesh, the current sidecar forwards the service request to the sidecar associated with the target microservice, and then the sidecar associated with the target microservice forwards the service request to the target microservice.

It should be noted that the sidecars and the microservice in this embodiment may be in an identical host or in different hosts. The microservice and the sidecars may be deployed in the form of processes, docker containers, Kubernetes (K8s) pods, etc. A method for enabling a sidecar to intercept a request sent by a microservice associated with the sidecar may be configuring an iptables rule, configuring an ipvs rule, hardware configuration, etc. Sidecar-related parameters may be configured for the microservice through an annotation, a configuration file, or a configuration database of an K8s object, or other means.

In this embodiment, according to a resource requirement and a reliability requirement of a microservice, a sidecar type configured for the microservice is determined. The sidecar type includes a shared sidecar, which may be associated with multiple microservices in the network. Compared with a conventional technology in which a different sidecar is configured for each microservice in the service mesh, resource consumption can be greatly reduced. Then, a sidecar is deployed for the microservice according to the sidecar type, and a published port is allocated to the microservice. When the sidecar type configured for the microservice is the shared sidecar, the published port allocated to the microservice is different from a published port of another microservice sharing the sidecar. Different published ports can avoid confusion of the sidecar associated with the multiple microservices during forwarding, such that the sidecar can correctly send an access request to the target microservice according to the published port, thereby ensuring normal communication between microservices.

Figure 7:
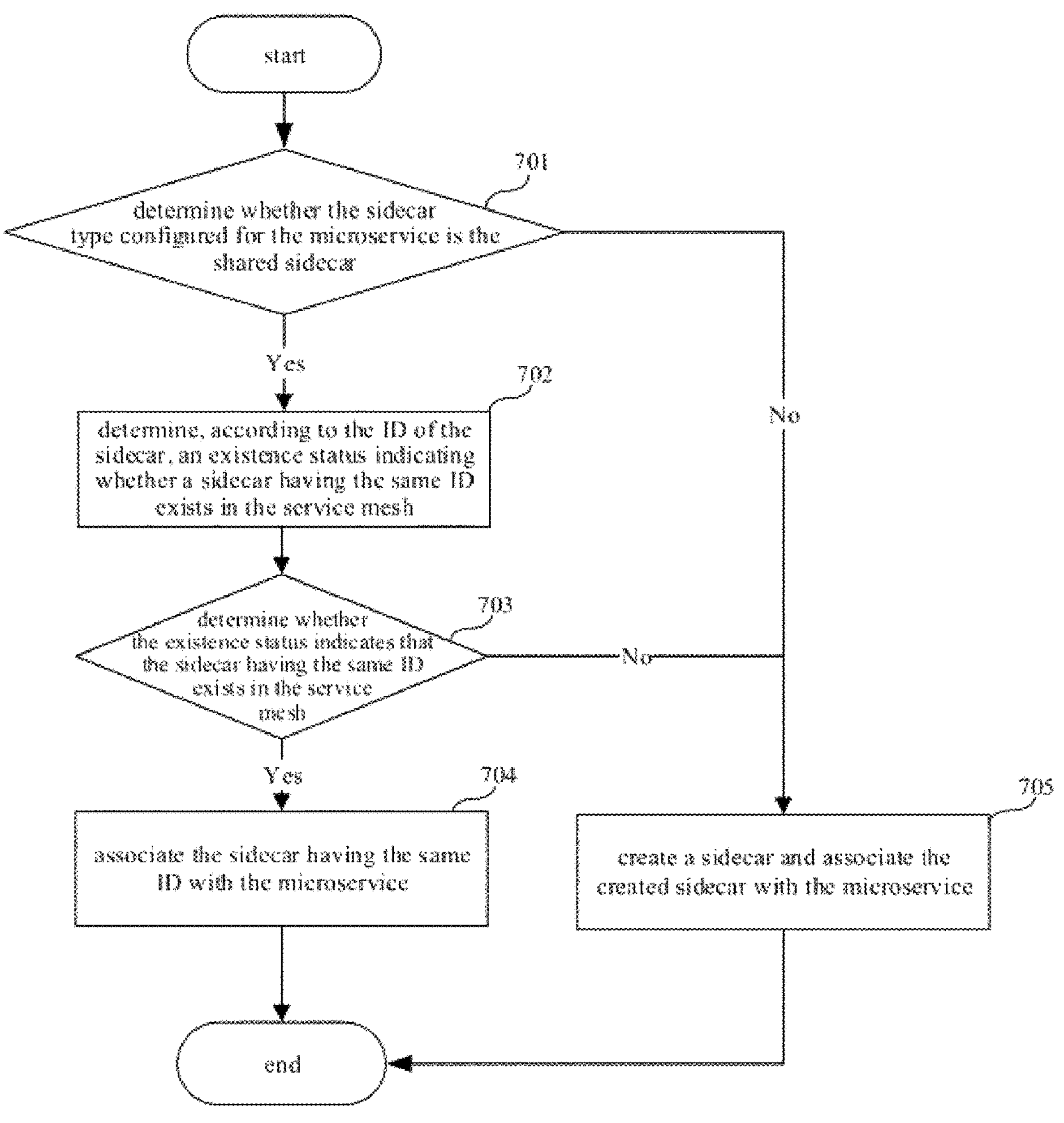
FIG. 7 is a flowchart of a method for deploying a sidecar for a microservice depending on a sidecar type according to another embodiment of the present disclosure.

Another embodiment of the present disclosure relates to a method for deploying a sidecar in a service mesh. In this embodiment, the parameter of the sidecar includes the ID of the sidecar, and an example process of deploying a sidecar for the microservice according to the sidecar type is shown in FIG. 7.

Before the step 701, the method further includes the steps 401 and 402.

In the step of 401, according to a resource requirement and a reliability requirement of a microservice, a sidecar type configured for the microservice is determined, where the sidecar type includes an exclusive sidecar and a shared sidecar. In the step of 402, a sidecar is deployed for the microservice according to the sidecar type, and a published port is allocated to the microservice. When the sidecar type configured for the microservice is the shared sidecar, the published port allocated to the microservice is different from a published port of another microservice sharing the sidecar.

The technical details related to the steps 401 and 402 mentioned in the foregoing embodiments are still valid in this embodiment, and the details will not be repeated here to reduce repetition.

In a step of 701, it is determined whether the sidecar type configured for the microservice is the shared sidecar.

In an example, the deployment of the sidecar for the microservice is based on the sidecar type configured for the microservice. Therefore, in this step, the apparatus for deploying a sidecar in a service mesh firstly determines the sidecar type configured for the microservice. When the sidecar type configured for the microservice is the shared sidecar, step 702 is executed. When the sidecar type configured for the microservice is the exclusive sidecar, step 705 is executed.

In the step of 702, an existence status indicating whether a sidecar having an identical ID exists in the service mesh is determined according to the ID of the sidecar.

When the sidecar type configured for the microservice is the shared sidecar, an existence status indicating whether a sidecar having the identical ID exists in the service mesh is determined according to the ID of the sidecar. The sidecar is in turn deployed for the microservice according to the existence status.

In a step of 703, it is determined whether the existence status indicates that the sidecar having the identical ID exists in the service mesh.

When the existence status indicates that the sidecar having the identical ID exists in the service mesh, it indicates that the sidecar to be deployed by the apparatus for the microservice has already existed in the service mesh, and step 704 is executed. Otherwise, it indicates that the sidecar to be deployed by the apparatus for the microservice does not exist in the service mesh, and step 705 is executed.

In the step of 704, the sidecar having the identical ID is associated with the microservice.

When the existence status indicates that the sidecar having the identical ID exists in the service mesh, it indicates that the sidecar to be deployed by the apparatus for the microservice has already existed in the service mesh, and the sidecar having the identical ID is associated with the microservice. In this way, the number of sidecars in the service mesh can be reduced, thereby effectively saving network resources.

In the step of 705, a sidecar is created, and then associated with the microservice.

In an example, when the sidecar type configured for the microservice is the shared sidecar and the existence status indicates that the sidecar having the identical ID does not exist in the service mesh, a sidecar is created, and then associated with the microservice. When the sidecar type configured for the microservice is the exclusive sidecar, a sidecar is created, and then associated with the microservice.

In an example embodiment, an ID of a sidecar to be configured for a microservice A1 is X. Then, a sidecar with an ID of X should be created when it deployed for the microservice A1. When an ID of a sidecar to be configured for a microservice A2 is also X, in order to deploy a sidecar for the microservice A2, it is not necessary to create a sidecar, but only needs to establish an association between the microservice A2 and the sidecar X.

Figure 8:
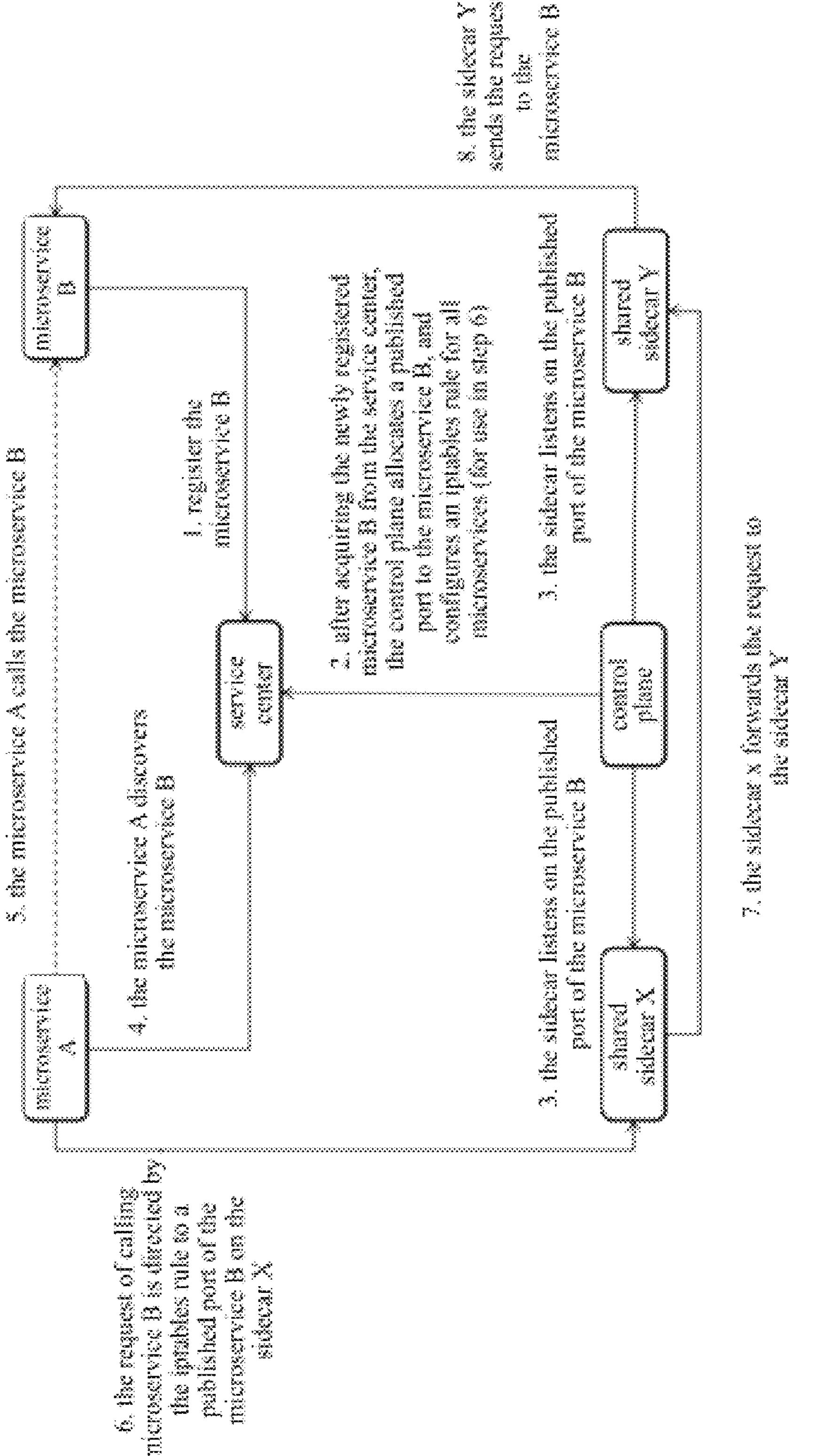
FIG. 8 is a schematic diagram of a process of microservice communication according to another embodiment of the present disclosure.

After a shared sidecar is configured for the microservice, the communication process between microservices is shown in FIG. 8. First, the microservice B is registered in the service center. Then, the control plane of the service mesh is configured to acquire the newly registered microservice B from the service center, allocate a published port to the microservice B, and configure an iptables rule for the microservice B. A sidecar Y associated with the microservice B is configured to listen on the published port of the microservice B.

The microservice A is configured to discover the existence of the microservice B through the service center, and send a call request to the microservice B. The call request is directed by the iptables rule to a published port of the microservice B on the sidecar X associated with the microservice A. In an example, the sidecar X is configured to forward the call request to the sidecar Y, and finally the sidecar Y is configured to send the request to the microservice B.

In this embodiment, for a microservice for which the configured sidecar type is the exclusive sidecar, when a sidecar having the identical ID as an ID of a sidecar configured for the microservice does not exist in the service mesh, a sidecar is created and an association relationship is established between the created sidecar and the microservice. When the sidecar type configured for the microservice is the shared sidecar and a sidecar having the identical ID as the ID of the sidecar configured for the microservice exists in the service mesh, the microservice is associated with the sidecar having the identical ID. In this way, the number of sidecars in the service mesh can be reduced, thereby effectively reducing network resources occupied by the service mesh.

Figure 9:
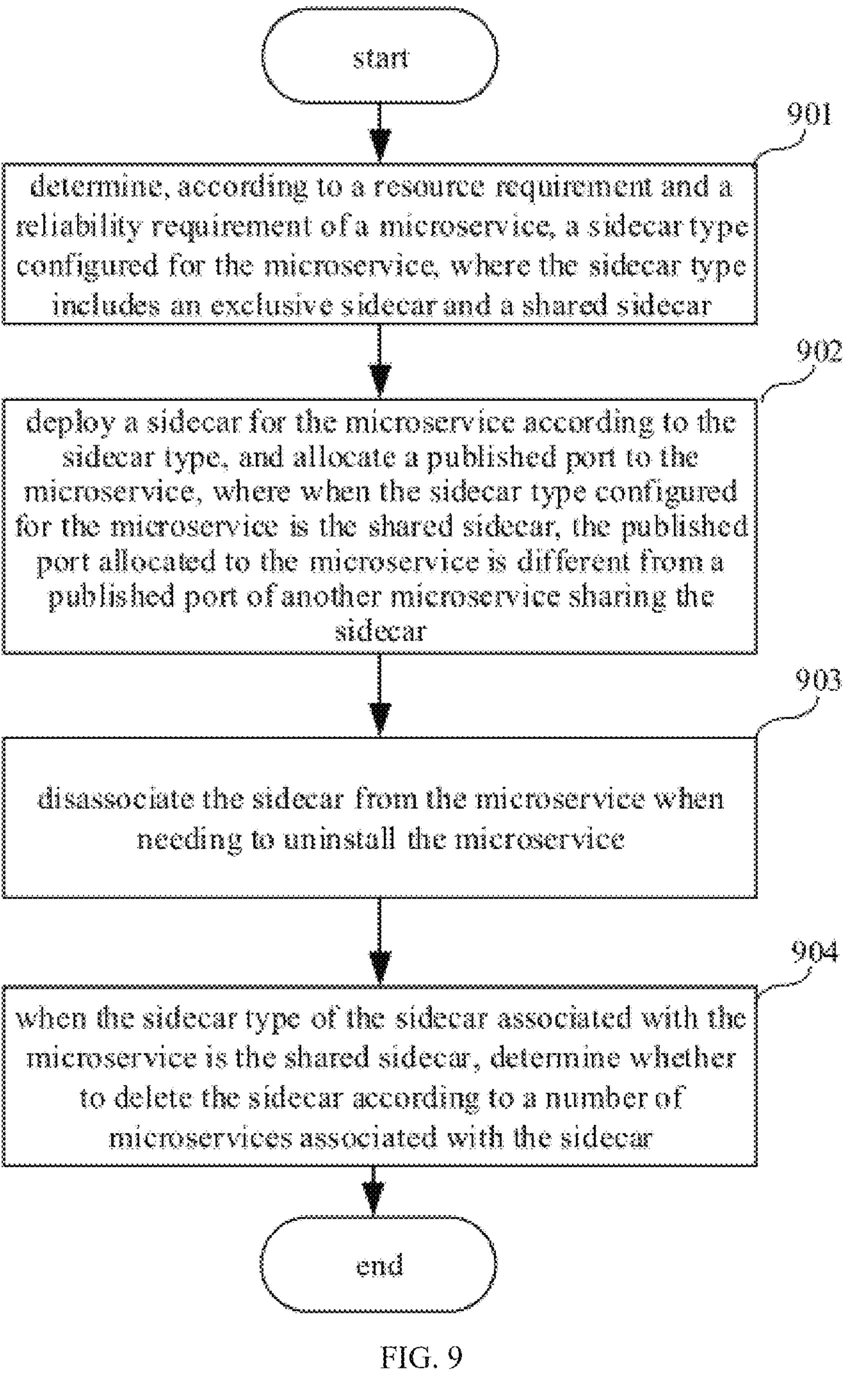
FIG. 9 is a flowchart of a method for deploying a sidecar in a service mesh according to another embodiment of the present disclosure.

Another embodiment of the present disclosure relates to a method for deploying a sidecar in a service mesh. FIG. 9 shows an example process of the method.

In a step of 901, according to a resource requirement and a reliability requirement of a microservice, a sidecar type configured for the microservice is determined. The sidecar type includes an exclusive sidecar and a shared sidecar.

In a step of 902, a sidecar is deployed for the microservice according to the sidecar type, and a published port is allocated to the microservice. When the sidecar type configured for the microservice is the shared sidecar, the published port allocated to the microservice is different from a published port of another microservice sharing the sidecar.

It can be seen that steps 901 and 902 in this embodiment are the same as steps 401 to 402 in the above embodiments. The related technical details mentioned in the foregoing embodiments are still valid in this embodiment, and the details will not be repeated here to reduce repetition.

In a step of 903, the sidecar is disassociated from the microservice when the microservice has to be uninstalled.

In this step, the microservice is uninstalled. In order to fully release the occupied resources, it is also necessary to disassociate the sidecar from the microservice.

In a step of 904, when the sidecar type of the sidecar associated with the microservice is the shared sidecar, it is determined whether to delete the sidecar according to a number of microservices associated with the sidecar.

In an example, determining whether to delete the sidecar according to a number of microservices associated with the sidecar may include the following step: the sidecar is maintained when the number of microservices associated with the sidecar is greater than 0; otherwise, the sidecar is deleted when the number of microservices associated with the sidecar is not greater than 0. When the sidecar associated with the uninstalled microservice is no longer associated with any microservice, the sidecar is deleted, in order to release the resources occupied by the sidecar.

In this embodiment, after the microservice is uninstalled, the association relationship between the sidecar and the microservice can be removed. When the sidecar type of the sidecar associated with the microservice is the shared sidecar, whether to delete the sidecar can be determined according to a number of microservices associated with the sidecar. In this way, the occupied resources can be released as much as possible, and erroneous deletion of a sidecar still associated with a microservice can be avoided.

Figure 10:
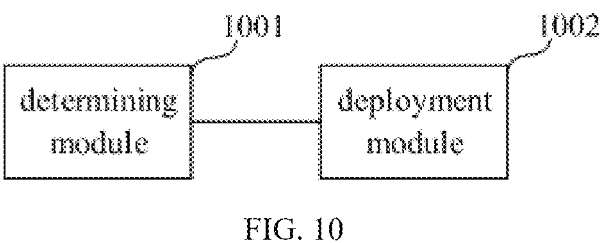
FIG. 10 is a schematic structural diagram of an apparatus for deploying a sidecar in a service mesh according to an embodiment of the present disclosure.

An embodiment of the present disclosure relates to an apparatus for deploying a sidecar in a service mesh. As shown in FIG. 10, the apparatus includes following modules.

A determining module 1001 is configured to determine, according to a resource requirement and a reliability requirement of a microservice, a sidecar type configured for the microservice. The sidecar type includes an exclusive sidecar and a shared sidecar.

A deployment module 1002 is configured to deploy a sidecar for the microservice according to the sidecar type, and allocate a published port to the microservice. When the sidecar type configured for the microservice is the shared sidecar, the published port allocated to the microservice is different from a published port of another microservice sharing the sidecar.

In an example, the apparatus for deploying a sidecar in a service mesh may further include a configuration module (not shown) configured to configure a parameter of the sidecar for the microservice, after the sidecar type configured for the microservice is determined and before the sidecar is deployed for the microservice according to the sidecar type. The parameter includes one or any combination of: an ID of the sidecar, a name of the sidecar, a resource quota of the sidecar, and a quantity of sidecars.

In an example, the deployment module 1002 may be further configured to determine, according to the ID of the sidecar, an existence status indicating whether a sidecar having the identical ID exists in the service mesh when the sidecar type configured for the microservice is the shared sidecar, deploy the sidecar for the microservice according to the existence status.

In an example, the deployment module 1002 may be further configured to associate the sidecar having the identical ID with the microservice when the existence status indicates that the sidecar having the identical ID exists in the service mesh, or create a sidecar and associating the created sidecar with the microservice when the existence status indicates that the sidecar having the identical ID does not exist in the service mesh.

In an example, the apparatus for deploying a sidecar in a service mesh may further include an uninstallation module (not shown) configured to uninstall the microservice and disassociating the sidecar from the microservice after the published port is allocated to the microservice, and determine whether to delete the sidecar according to a number of microservices associated with the sidecar when the sidecar type of the sidecar associated with the microservice is the shared sidecar.

In an example, the uninstallation module may be further configured to maintain the sidecar when the number of microservices associated with the sidecar is greater than 0, otherwise, delete the sidecar when the number of microservices associated with the sidecar is not greater than 0.

In an example, the deployment module 1002 may be further configured to create a sidecar and associate the created sidecar with the microservice when the sidecar type configured for the microservice is the exclusive sidecar.

The apparatus for deploying a sidecar in a service mesh in this embodiment can determine, according to a resource requirement and a reliability requirement of a microservice, a sidecar type configured for the microservice. The sidecar type includes a shared sidecar, which may be associated with multiple microservices in the network. Compared with a conventional technology of configuring a different sidecar for each microservice in the service mesh, resource consumption can be greatly reduced. Then, the apparatus for deploying a sidecar in a service mesh in this embodiment can deploy a sidecar for the microservice according to the sidecar type, and allocate a published port to the microservice. When the sidecar type configured for the microservice is the shared sidecar, the published port allocated to the microservice is different from a published port of another microservice sharing the sidecar. Different published ports can avoid confusion of the sidecar associated with the multiple microservices during forwarding, so that the sidecar can correctly send an access request to the target microservice according to the published port, to ensure normal communication between microservices.

It is to be noted that each module involved in the above embodiments of the present disclosure is a logic module. In practical applications, a logic unit may be a physical unit or a part of a physical unit, or may be implemented by a combination of a plurality of physical units. In addition, in order to highlight the innovative part of the present disclosure, units that are not closely related to the technical problem to be solved in the present disclosure are not introduced in this embodiment, but this does not mean that there are no other units in this embodiment.

Figure 11:
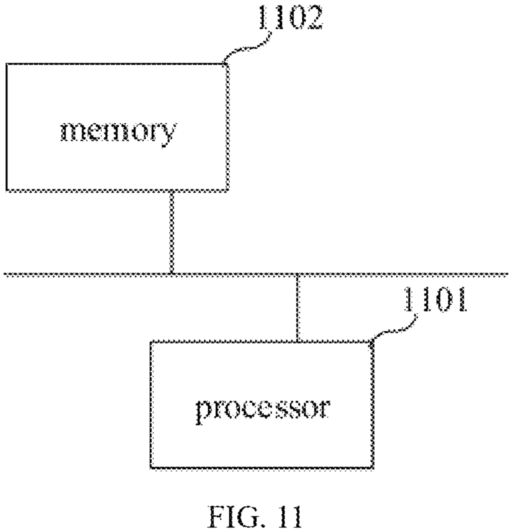
FIG. 11 is a schematic structural diagram of an electronic device according to another embodiment of the present disclosure.

An embodiment of the present disclosure provides an electronic device. As shown in FIG. 11, the electronic device includes at least one processor 1101 and a memory 1102 communicatively connected to the at least one processor 1101. The memory 1102 stores an instruction executable by the at least one processor 1101 which, when executed by the at least one processor 1101, causes the at least one processor 1101 to implement the method for deploying a sidecar in a service mesh.

The memory 1102 and the processor 1101 are connected by a bus. The bus may include any number of interconnected buses and bridges. The bus connects various circuits of one or more processors 1101 and the memory 1102 together. The bus may also connect together a peripheral device, a voltage regulator, a power management circuit, and other circuits, which are well known in the art and therefore will not be detailed herein. A bus interface provides an interface between the bus and a transceiver. The transceiver may be one element or a plurality of elements, for example, a plurality of receivers and transmitters, and provides a unit for communicating with various other apparatus over a transmission medium. Data processed by the processor 1101 is transmitted over a wireless medium through an antenna. In an example, the antenna further receives data and transmits the data to the processor 1101.

The processor 1101 is responsible for managing the bus and general processing and may also provide various functions including timing, peripheral interfaces, voltage regulation, power management and other control functions. The memory 1102 may be configured to store data used by the processor 1101 in performing operations.

The product can execute the methods for deploying a sidecar in a service mesh according to the embodiments of the present disclosure, and has functional modules and beneficial effects corresponding to the methods executed. For technical details that are not described in detail in this embodiment, reference may be made to the methods provided in the embodiments of the present disclosure.

An embodiment of the present disclosure provides a computer-readable storage medium, storing a computer program which, when executed by a processor, causes the processor to implement the method for deploying a sidecar in a service mesh.

In this embodiment of the present disclosure, according to a resource requirement and a reliability requirement of a microservice, a sidecar type configured for the microservice is determined. The sidecar type includes a shared sidecar, which may be associated with multiple microservices in the network. Compared with a conventional technology of configuring a different sidecar for each microservice in the service mesh, resource consumption can be greatly reduced. Then, a sidecar is deployed for the microservice according to the sidecar type, and a published port is allocated to the microservice. When the sidecar type configured for the microservice is the shared sidecar, the published port allocated to the microservice is different from a published port of another microservice sharing the sidecar. Using different published ports can avoid confusion of the sidecar associated with the multiple microservices during forwarding, so that the sidecar can correctly send an access request to the target microservice according to the published port, to ensure normal communication between microservices.

It may be understood by those having ordinary skill in the art that all or some of the steps of the methods in the above embodiments may be performed by a program instructing related hardware. The program is stored in a storage medium, and includes several instructions to cause a device (which may be a single chip microcomputer, a chip, etc.) or a processor to perform all or some of the operations of the methods described in the embodiments of the present disclosure. The foregoing storage medium includes: any medium that can store program code, such as Universal Serial Bus (USB) flash drive, removable hard disk, Read-Only Memory (ROM), Random Access Memory (RAM), magnetic disk, or optical disk.

The above embodiments are provided for those having ordinary skills in the art to implement and use the present disclosure, and those having ordinary skills in the art can make various modifications or changes to the above embodiments without departing from the inventive idea of the present disclosure. Therefore, the scope of protection of the present disclosure is not limited by the above embodiments, but should conform to the maximum scope of the innovative features mentioned in the claims.

What is claimed is:

1. A method for deploying a sidecar in a service mesh, comprising:

determining, according to a resource requirement and a reliability requirement of a microservice, a sidecar type configured for the microservice, wherein the sidecar type comprises an exclusive sidecar and a shared sidecar; and deploying a sidecar for the microservice according to the sidecar type, and allocating a published port to the microservice, wherein in response to the sidecar type configured for the microservice being the shared sidecar, the published port allocated to the microservice is different from a published port of another microservice sharing the sidecar.

2. The method for deploying a sidecar in a service mesh of claim 1, wherein after determining a sidecar type configured for the microservice and prior to deploying a sidecar for the microservice according to the sidecar type, the method further comprises:

configuring a parameter of the sidecar for the microservice, wherein the parameter comprises one or any combination of:

an identifier (ID) of the sidecar, a name of the sidecar, a resource quota of the sidecar, and a quantity of sidecars.

3. The method for deploying a sidecar in a service mesh of claim 2, wherein in response to the parameter of the sidecar comprising the ID of the sidecar, deploying a sidecar for the microservice according to the sidecar type comprises:

in response to the sidecar type configured for the microservice being the shared sidecar, determining, according to the ID of the sidecar, an existence status indicating whether a sidecar having an identical ID exists in the service mesh; and deploying the sidecar for the microservice according to the existence status.

4. The method for deploying a sidecar in a service mesh of claim 3, wherein deploying the sidecar for the microservice according to the existence status comprises:

associating the sidecar having the identical ID with the microservice, in response to the existence status indicating that the sidecar having the identical ID exists in the service mesh; or creating a sidecar and associating the created sidecar with the microservice, in response to the existence status indicating that the sidecar having the identical ID does not exist in the service mesh.

5. The method for deploying a sidecar in a service mesh of claim 1, wherein after allocating a published port to the microservice, the method further comprises:

disassociating the sidecar from the microservice in response to a need to uninstall the microservice, and in response to the sidecar type of the sidecar associated with the microservice being the shared sidecar, determining whether to delete the sidecar according to a number of microservices associated with the sidecar.

6. The method for deploying a sidecar in a service mesh of claim 5, wherein determining whether to delete the sidecar according to a number of microservices associated with the sidecar comprises:

maintaining the sidecar in response to the number of microservices associated with the sidecar being greater than 0; or deleting the sidecar in response to the number of microservices associated with the sidecar being not greater than 0.

7. The method for deploying a sidecar in a service mesh of claim 1, wherein deploying a sidecar for the microservice according to the sidecar type comprises:

creating a sidecar and associating the created sidecar with the microservice, in response to the sidecar type configured for the microservice being the exclusive sidecar.

8. An electronic device, comprising:

at least one processor; and a memory communicatively connected to the at least one processor, wherein:

the memory stores an instruction executable by the at least one processor which, when executed by the at least one processor, causes the at least one processor to perform a method for deploying a sidecar in a service mesh comprising:

determining, according to a resource requirement and a reliability requirement of a microservice, a sidecar type configured for the microservice, wherein the sidecar type comprises an exclusive sidecar and a shared sidecar; and deploying a sidecar for the microservice according to the sidecar type, and allocating a published port to the microservice, wherein in response to the sidecar type configured for the microservice being the shared sidecar, the published port allocated to the microservice is different from a published port of another microservice sharing the sidecar.

9. The electronic device of claim 8, wherein after determining a sidecar type configured for the microservice and prior to deploying a sidecar for the microservice according to the sidecar type, the method further comprises:

configuring a parameter of the sidecar for the microservice, wherein the parameter comprises one or any combination of:

an identifier (ID) of the sidecar, a name of the sidecar, a resource quota of the sidecar, and a quantity of sidecars.

10. The electronic device of claim 9, wherein in response to the parameter of the sidecar comprising the ID of the sidecar, deploying a sidecar for the microservice according to the sidecar type comprises:

in response to the sidecar type configured for the microservice being the shared sidecar, determining, according to the ID of the sidecar, an existence status indicating whether a sidecar having an identical ID exists in the service mesh; and deploying the sidecar for the microservice according to the existence status.

11. The electronic device of claim 10, wherein deploying the sidecar for the microservice according to the existence status comprises:

associating the sidecar having the identical ID with the microservice, in response to the existence status indicating that the sidecar having the identical ID exists in the service mesh; or creating a sidecar and associating the created sidecar with the microservice, in response to the existence status indicating that the sidecar having the identical ID does not exist in the service mesh.

12. The electronic device of claim 8, wherein after allocating a published port to the microservice, the method further comprises:

disassociating the sidecar from the microservice in response to a need to uninstall the microservice, and in response to the sidecar type of the sidecar associated with the microservice being the shared sidecar, determining whether to delete the sidecar according to a number of microservices associated with the sidecar.

13. The electronic device of claim 12, wherein determining whether to delete the sidecar according to a number of microservices associated with the sidecar comprises:

maintaining the sidecar in response to the number of microservices associated with the sidecar being greater than 0; or deleting the sidecar in response to the number of microservices associated with the sidecar being not greater than 0.

14. The electronic device of claim 8, wherein deploying a sidecar for the microservice according to the sidecar type comprises:

creating a sidecar and associating the created sidecar with the microservice, in response to the sidecar type configured for the microservice being the exclusive sidecar.

15. A non-transitory computer-readable storage medium, storing a computer program which, when executed by a processor, causes the processor to perform a method for deploying a sidecar in a service mesh comprising:

determining, according to a resource requirement and a reliability requirement of a microservice, a sidecar type configured for the microservice, wherein the sidecar type comprises an exclusive sidecar and a shared sidecar; and deploying a sidecar for the microservice according to the sidecar type, and allocating a published port to the microservice, wherein in response to the sidecar type configured for the microservice being the shared sidecar, the published port allocated to the microservice is different from a published port of another microservice sharing the sidecar.

16. The non-transitory computer-readable storage medium of claim 15, wherein after determining a sidecar type configured for the microservice and prior to deploying a sidecar for the microservice according to the sidecar type, the method further comprises:

configuring a parameter of the sidecar for the microservice, wherein the parameter comprises one or any combination of:

an identifier (ID) of the sidecar, a name of the sidecar, a resource quota of the sidecar, and a quantity of sidecars.

17. The non-transitory computer-readable storage medium of claim 16, wherein in response to the parameter of the sidecar comprising the ID of the sidecar, deploying a sidecar for the microservice according to the sidecar type comprises:

in response to the sidecar type configured for the microservice being the shared sidecar, determining, according to the ID of the sidecar, an existence status indicating whether a sidecar having an identical ID exists in the service mesh; and deploying the sidecar for the microservice according to the existence status.

18. The non-transitory computer-readable storage medium of claim 17, wherein deploying the sidecar for the microservice according to the existence status comprises:

associating the sidecar having the identical ID with the microservice, in response to the existence status indicating that the sidecar having the identical ID exists in the service mesh; or creating a sidecar and associating the created sidecar with the microservice, in response to the existence status indicating that the sidecar having the identical ID does not exist in the service mesh.

19. The non-transitory computer-readable storage medium of claim 15, wherein after allocating a published port to the microservice, the method further comprises:

disassociating the sidecar from the microservice in response to a need to uninstall the microservice, and in response to the sidecar type of the sidecar associated with the microservice being the shared sidecar, determining whether to delete the sidecar according to a number of microservices associated with the sidecar.

20. The non-transitory computer-readable storage medium of claim 19, wherein determining whether to delete the sidecar according to a number of microservices associated with the sidecar comprises:

maintaining the sidecar in response to the number of microservices associated with the sidecar being greater than 0; or deleting the sidecar in response to the number of microservices associated with the sidecar being not greater than 0.

* * * * *